(12) United States Patent
Berenbach et al.

(10) Patent No.: US 12,415,685 B2
(45) Date of Patent: Sep. 16, 2025

(54) TRANSFER DEVICE AND INSTALLATION FOR CONVEYING PRODUCTS

(71) Applicant: SIDEL PARTICIPATIONS, Octeville-sur-Mer (FR)

(72) Inventors: Alain Berenbach, Reichstett (FR); Olivier Douxamis, Reichstett (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 78 days.

(21) Appl. No.: 18/266,098

(22) PCT Filed: Dec. 10, 2021

(86) PCT No.: PCT/EP2021/085144
§ 371 (c)(1),
(2) Date: Jun. 8, 2023

(87) PCT Pub. No.: WO2022/122995
PCT Pub. Date: Jun. 16, 2022

(65) Prior Publication Data
US 2024/0034570 A1 Feb. 1, 2024

(30) Foreign Application Priority Data

Dec. 10, 2020 (FR) ...................................... 2013021

(51) Int. Cl.
*B65G 47/66* (2006.01)
*B65G 39/12* (2006.01)

(52) U.S. Cl.
CPC ............. *B65G 47/66* (2013.01); *B65G 39/12* (2013.01)

(58) Field of Classification Search
CPC .................................. B65G 47/66; B65G 39/12
(Continued)

(56) References Cited

U.S. PATENT DOCUMENTS 666,165 A * 1/1901 Titus et al. ............ B65G 39/12
384/419
4,172,516 A 10/1979 Curl
(Continued)

FOREIGN PATENT DOCUMENTS

CN 206358862 U 7/2017
JP S55101805 U 7/1980
(Continued)

OTHER PUBLICATIONS

JP2017095185A (Year: 2017).*
International Search Report dated Mar. 4, 2022 for PCT/EP2021/085144.

*Primary Examiner* — Gene O Crawford
*Assistant Examiner* — Lester Ill Rushin
(74) *Attorney, Agent, or Firm* — Blake T. Hudson

(57) ABSTRACT

Provided is a device for transferring products in a longitudinal direction of movement from upstream to downstream, having a transfer region and a structure supporting the transfer region. The structure has at least two parallel and contiguous rows of rollers mounted in rotation so as to be aligned along transverse axes, including a first row of first rollers and an adjacent second row of second rollers. The transfer region is inclined with a slope decreasing longitudinally. The rollers have bearings mounted in rotation about the axes and the first rollers of the first row are mounted in staggered fashion with respect to the second rollers of the second row, forming a generally planar transfer face. Also provided is conveying installation equipped with the transfer device.

10 Claims, 2 Drawing Sheets

Figure 1:
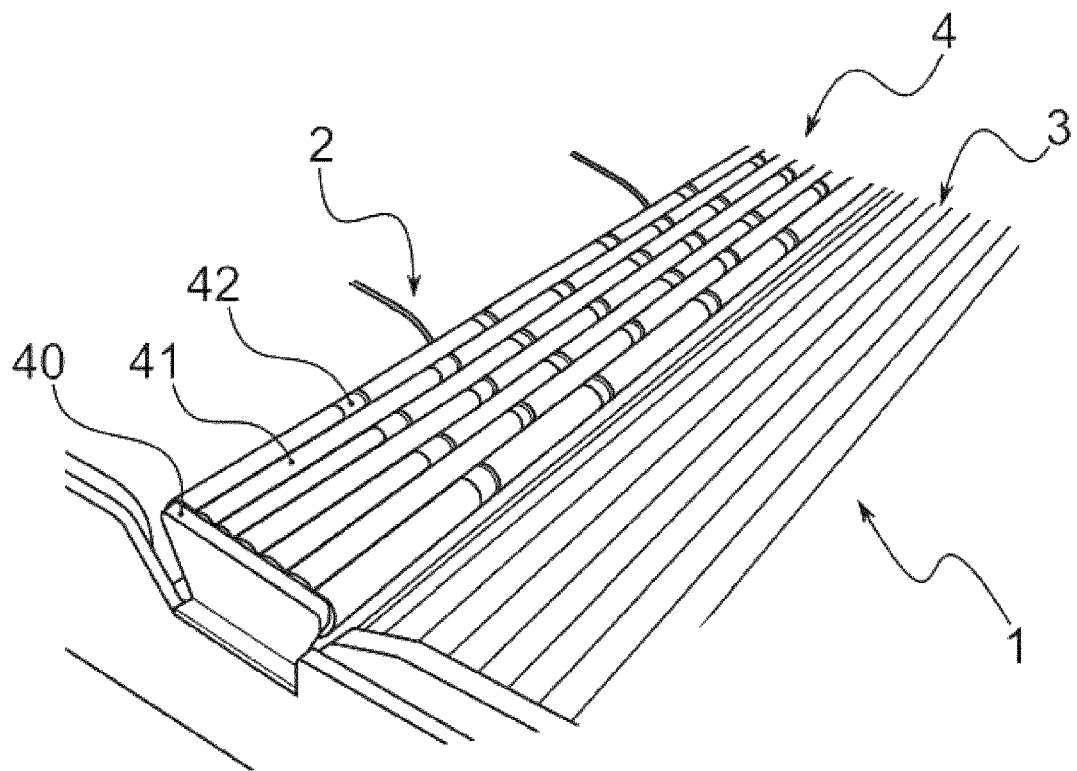

(58) Field of Classification Search
USPC .......................................................... 198/618
See application file for complete search history.

(56) References Cited

U.S. PATENT DOCUMENTS

| | | | | |
|---|---|---|---|---|
| 4,205,740 | A * | 6/1980 | Hammond | B65G 13/12 |
| | | | | 104/135 |
| 4,681,203 | A * | 7/1987 | Kornylak | B65G 13/11 |
| | | | | 193/35 R |
| 6,409,026 | B2 * | 6/2002 | Watanabe | A47F 1/12 |
| | | | | 312/71 |
| 11,247,849 | B2 * | 2/2022 | Kuhn | B65G 17/08 |
| 2020/0039750 | A1 | 2/2020 | Guerra | |
| 2025/0162808 | A1 * | 5/2025 | Kuhn | B65G 23/44 |

FOREIGN PATENT DOCUMENTS

| | | | |
|---|---|---|---|
| JP | 2017095185 A | 6/2017 | |
| JP | 2018144958 A | 9/2018 | |

* cited by examiner

TRANSFER DEVICE AND INSTALLATION FOR CONVEYING PRODUCTS

CROSS-REFERENCE TO RELATED APPLICATIONS

This application is the 35 U.S.C. § 371 national stage of PCT application having serial number PCT/EP2021/085144, filed on Dec. 10, 2021. This application also claims priority to French application having serial number FR2013021 filed on Dec. 10, 2020, which are entirely incorporated herein by reference.

The present invention is in the field of transferring and conveying products. For the purposes of the present invention, the term "product" encompasses an individual object. Such a product is a container, such as a bottle or a vial, or a carton, or a can. A product may be made of any type of material, in particular plastic, metal or glass. Depending on its shape and material, a product may be rigid or semi-rigid.

Such a container is intended to contain, non-exhaustively, a fluid, a liquid, powders or granules, in particular of the agro-food or cosmetic type.

Furthermore, a product may have any kind of shape, symmetrical or not, regular or irregular. In addition, a product may have a rounded cross section, of circular or ovoid overall shape, or a polygonal cross section, particularly rectangular or square.

In particular, such a container comprises a bottom that may be flat or substantially flat, or, conversely, that has one or more cavities, as is the case, for example, for a can with a concave bottom or for a bottle with a so-called "petaloid" bottom.

In a known manner, within an industrial line, the products may receive several different successive treatments, such as the manufacturing of the container, for example during a plastic injection or stretch-blow-molding operation in the case of a plastic bottle, followed by filling and then closing with a cap and labeling. At the end of these treatments, the products are said to be "finished."

For handling purposes, such finished products undergo batch packaging.

Furthermore, each batch comprises a group of several products, assembled in a matrix arrangement, generally of parallelepipedal overall shape, often square or rectangle, in columns and rows. As an example, a typical batch has six products in two rows and three columns.

Once the groups of products are made, each group may be packaged by wrapping or packing.

Wrapping consists in surrounding or covering the group of products with a sheet or a film in order to hold the products together and to facilitate the handling of such a batch thus obtained. Such a wrapping may be carried out by means of a film application step or preferably a shrink-wrapping step, or by a wrapping by means of a sheet, in particular of paper or cardboard material.

During these different steps, the products are transported along the production line, in a direction of travel, from upstream to downstream, between and within different stations dedicated to each treatment that the products must undergo. Such a transport may be carried out by means of at least one conveying installation.

The invention is specifically aimed at conveying products individually, in groups or in batches, and also transferring such products between an upstream conveyor and a downstream conveyor.

The conveying is further achieved by moving the products with their bottom resting on the upper face of one or more conveyors. This upper surface may be envisaged to be movable, generally in the form of one or more endless belts wound around at least one motorized winding and at least one return winding. In particular, there are essentially three types of belts, namely:
- a belt with a smooth surface, having a function of moving the products horizontally, even slightly inclined according to a small slope not exceeding 3% beyond which the products would risk slipping on said smooth surface;
- a belt in the form of a rubberized mat, whose material is constituted in such a way as to grip the products, in order to move the products over greater slopes and also to realize steps between the packs by simply adjusting the speeds between the conveyors;
- a belt with freely rotating wheels, intended to accumulate products that are placed next to each other.

In this context, along an installation, it is necessary to transfer the products between an upstream conveyor and a downstream conveyor. The invention also targets such a transfer of products.

The transfer from the upstream conveyor to the downstream conveyor further requires crossing the gap between the abutting ends of said conveyors. Such a gap, due to the winding of the conveyors, has a hollow shape within which the bottom of the products may become partially inserted, unbalancing them and risking causing them to fall.

A widely used solution consists in closing this gap by a fixed zone, in particular in the form of a stationary plate, on the surface of which the products move by sliding, only due to the action of the pushing of the products displaced by the downstream conveyor.

Moreover, the lack of motorization has the disadvantage of stalling shorter products.

In addition, this push operation does not allow for the transfer of a desired evenly spaced product flow.

However, the friction and pushing may again induce an imbalance of the products, and a change of position of one or more of the products which were previously well arranged as a matrix in a group. In addition, these plates exhibit pronounced wear over time.

This disadvantage of a stationary plate is all the more constraining when the length of this plate is greater than the longitudinal dimension of the products or a group of products being transferred, i.e. the length in the longitudinal direction of travel from upstream to downstream.

One current solution is to modify the configuration of the contiguous ends of the upstream and downstream conveyors by decreasing the diameter of the windings of said ends. This smaller diameter thus reduces the length of the gap and, consequently, the length of the stationary plate.

However, a reduced-diameter winding requires the addition of return windings situated in the lower part, making the conveyors more complex and increasing their manufacturing cost. Reducing the winding of the upstream and/or downstream conveyors further reduces the length of the gap and, therefore, of the stationary plate.

However, this solution requires thinner belts, which are therefore less robust over time, reducing the life of the conveyors.

An alternative solution consists of a transfer zone provided with wheels mounted to rotate freely directly about fixed axles, in several rows extending transversely, i.e. orthogonally to said longitudinal direction. The freedom of movement in rotation of the wheels has the effect of accompanying the movement induced by the upstream conveyor when crossing such a transfer zone.

However, these rows of wheels form a non-planar surface, with regular dimples between rows, which are again liable to unbalance the products. In addition, although the products move more easily on the freely rotating wheels, the friction of the wheels about their fixed axle limits their rotation. Therefore, it is still necessary to carry out a consequent pushing by the products arriving from the upstream conveyor, especially if the products or the group of products have a longitudinal dimension less than the length of said plate.

Therefore, in order to facilitate the movement of the products along a transfer zone with wheels, the surface is oriented with a downward slope from upstream to downstream.

In addition, such a slope has a significant inclination, due to the mounting of the wheels in rotation directly on their axle, with significant friction.

As it stands, this descent causes a negative differential between the heights of the upper surfaces between the upstream conveyor and the downstream conveyor. Such a negative differential must be compensated for, as it is well understood that the repetition of numerous transfers between the conveyors and/or the treatment stations would lead to an undesired declination in the layout of a production line.

The downstream conveyor is therefore envisaged to be increasingly inclined, which again leads to risks of the products becoming unbalanced toward the rear, or even sliding in the direction opposite to the conveyance, which is again liable to result in disordering of the product groups or the spacing between the products, or even the interval between the groups and the products following one another.

Furthermore, it is not possible to envisage too great a declivity, either for the transfer zone or for the downstream conveyor, so as not to unbalance the products or groups of products. Therefore, with a low slope, the products do not move properly, risking losing their positioning within a group or the regularity of the interval therebetween.

The object of the invention is to overcome the disadvantages of the state of the art by offering a conveying device with an optimized transfer zone between the ends of the upstream and downstream conveyors, ensuring the stability of the products during their transfer. In particular, the invention provides for a specific declivity of the transfer zone, with an overall planar surface, in order to avoid any imbalance of the products during their progression along said transfer zone. This planarity is obtained by the transverse offset of rollers between two successive rows, in a staggered configuration.

For this purpose, the invention concerns a device for transferring products in a longitudinal direction of travel from upstream to downstream.

Additionally, such a transfer device comprises:
- a transfer zone and a structure, said structure supporting the transfer zone;
- said transfer zone comprising at least two parallel and contiguous rows of rollers rotatably mounted in alignment along axles transverse to said direction, including a first row of first rollers and an adjacent second row of second rollers, characterized in that
- said transfer zone is inclined with a decreasing slope along said direction;
- said rollers comprising bearings mounted rotatably about said axles;
- the first rollers of the first row are staggered with respect to the second rollers of the second row, forming an overall planar transfer face.

According to additional, non-limiting features, said slope may decrease with a degree of declivity less than or equal to 23°, preferably with a degree of declivity less than or equal to 7°.

Said rollers may have a diameter less than or equal to 20 millimeters, preferably a diameter less than or equal to 11 millimeters.

Said transfer device may comprise a center distance between the first rollers and the second rollers, said center distance being greater than said diameter by no more than millimeters, preferably no more than 1 millimeter.

Furthermore, combined with the slope, the small diameter of the rollers, relative to the larger diameter of the windings of the upstream and downstream conveyors, allows for the depth of the gaps between said rollers to be reduced, but also allows the upstream and downstream ends of the conveyors to abut as closely as possible in the transfer zone.

In addition, the low degree of declivity of the slope along an almost planar surface, in particular by means of smaller roller diameters, ensures that the products remain stable and do not tilt to the point of being unbalanced during their progression. In addition, the rollers equipped with bearings ensure that they rotate correctly along this low-grade slope.

Thus, the transfer according to the invention is carried out solely by gravity along its transfer zone.

The invention also relates to an installation for conveying products in a longitudinal direction of travel from upstream to downstream. Advantageously, such a conveying installation is equipped with a transfer device, as described previously.

Said conveying installation further comprises
- at least one upstream conveyor with a downstream end;
- at least one downstream conveyor with an upstream end, the upstream end of said downstream conveyor being contiguous with the downstream end of said upstream conveyor;
- a transfer surface between the upstream end and the downstream end.

Such a conveying installation is characterized in that said transfer surface comprises a transfer device according to the invention.

According to additional, non-limiting features, the upstream end of the downstream conveyor may be positioned below the downstream end of the upstream conveyor at a height of no more than 50 millimeters, preferably at a height of no more than 20 millimeters.

Thus, the gentle slope allows the products to circulate along the transfer device, on an almost planar surface, solely under the effect of gravity, without requiring motorization of the upstream conveyor or a push from the products coming from this upstream conveyor.

Furthermore, the controlled slope also allows the downstream conveyor to be positioned at a low height below the upstream conveyor, limiting any subsequent significant height compensation along the production line.

Figure 2:
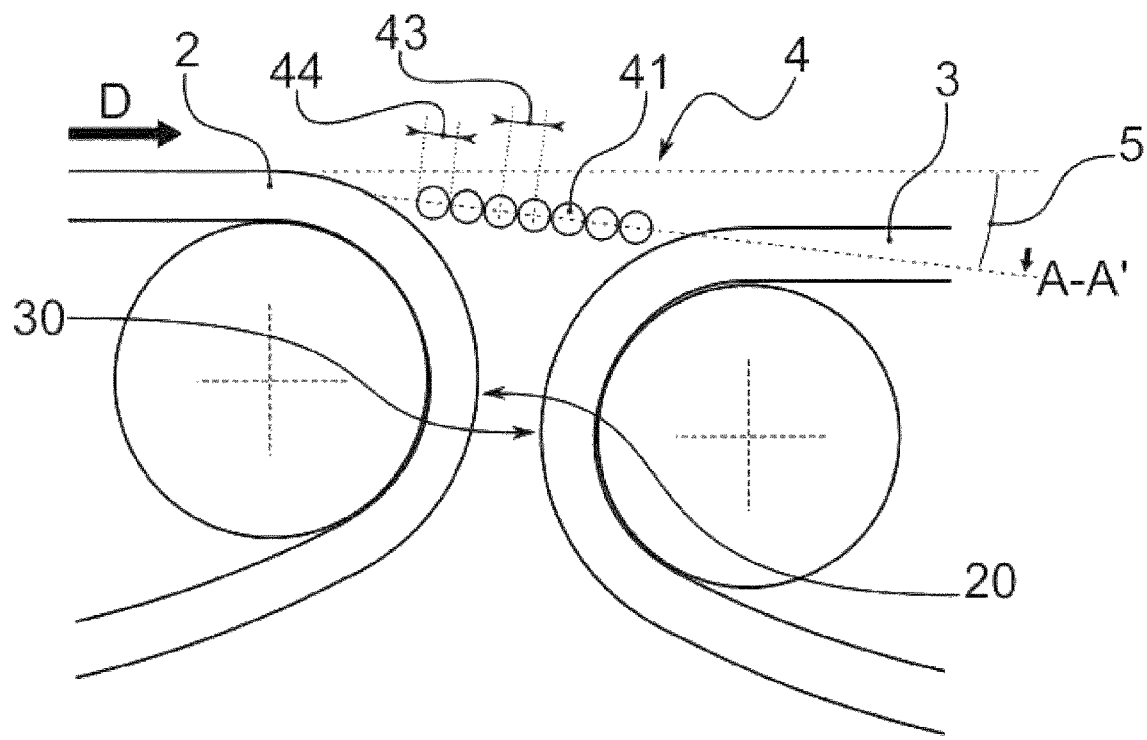
Figure 3:
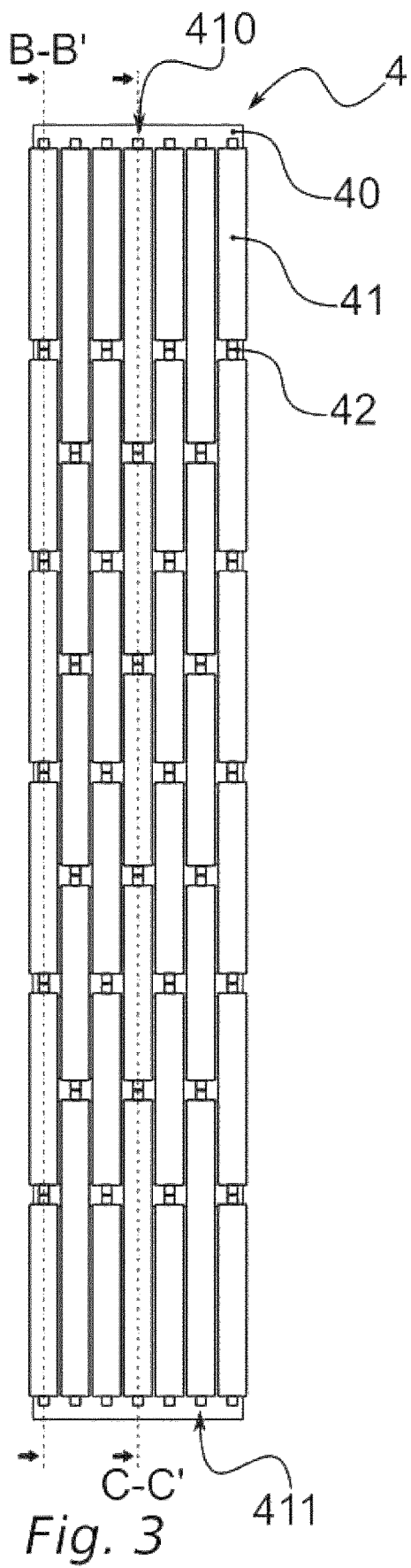
Figure 4:
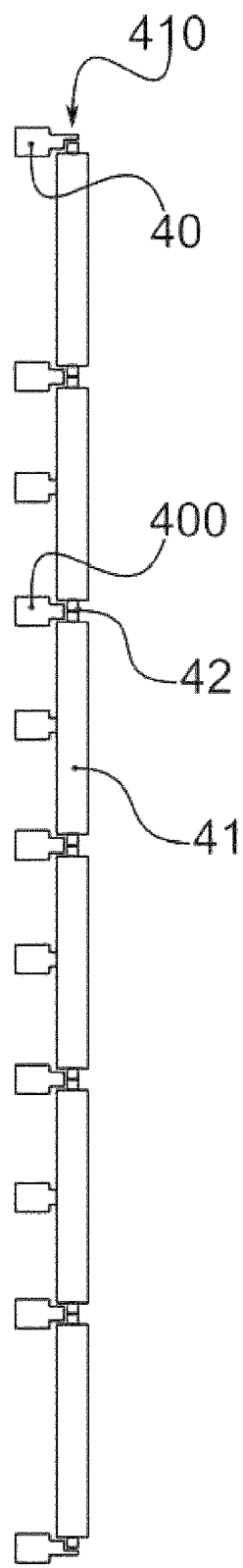
Figure 5:
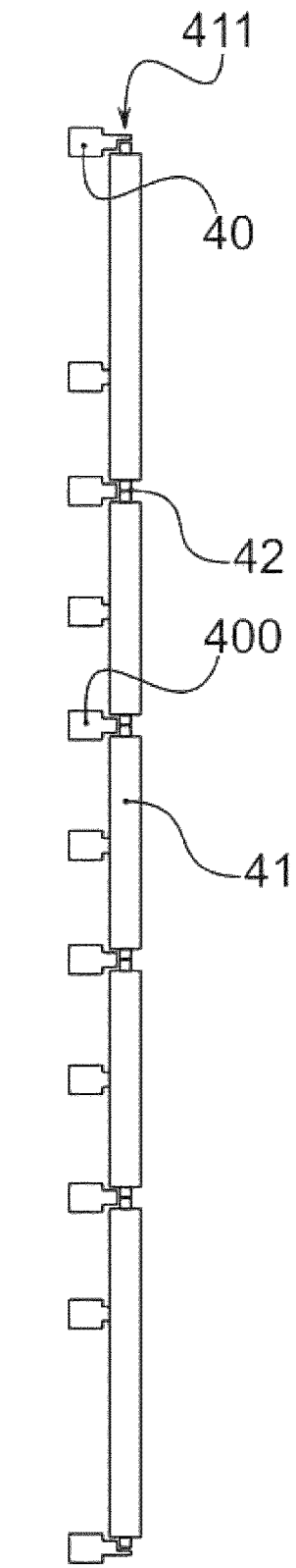

Further features and advantages of the invention will become apparent from the following detailed description of non-limiting embodiments of the invention, with reference to the attached figures, in which:

FIG. 1 schematically shows a partial perspective view of an embodiment of a conveying installation, showing specifically the transfer zone equipped with a device for transferring products between the ends of the upstream and downstream conveyors;

FIG. 2 schematically shows a simplified view of a vertical cross section of an embodiment of a transfer device;

FIG. 3 schematically shows a partial cross-sectional view along the axis A-A' of FIG. 2, showing in particular the staggered configuration of the rollers between the rows;

FIG. 4 schematically shows a cross-sectional view along the axis B-B' of FIG. 3, showing in particular a first row of first rollers; and FIG. 5 schematically shows a cross-sectional view along the axis C-C' of FIG. 4, showing in particular a second row of second rollers.

The present invention is in the field of transferring and conveying products.

For the purposes of the present invention, the term "product" encompasses an individual object. Such a product is a container, such as a bottle or a vial, or a carton, or a can. A product may be made of any type of material, in particular plastic, metal or glass. Depending on its shape and material, a product may be rigid or semi-rigid.

Such a container is intended to contain, non-exhaustively, a fluid, a liquid, powders or granules, in particular of the agro-food or cosmetic type.

Moreover, a product may have any kind of shape, symmetrical or not, regular or irregular.

In addition, a product may have a rounded cross section, of circular or ovoid overall shape, or a polygonal cross section, particularly rectangular or square.

In particular, such a container comprises a bottom that may be flat or substantially flat, or, conversely, that has one or more cavities, as is the case, for example, for a can with a concave bottom or for a bottle with a so-called "petaloid" bottom.

As mentioned previously, within an industrial line, the products may receive several successive treatments. During these different steps, the products are transported along the production line, between and within different stations dedicated to each treatment that the products must undergo.

For handling purposes, such products undergo batch packaging.

Furthermore, each batch comprises a group of several products, assembled in a matrix arrangement, generally of parallelepipedal overall shape, often square or rectangle, in columns and rows. As an example, a typical batch has six products in two rows and three columns.

In the context of the present invention, the transport of the products, individually or in batches, is carried out in a direction D of travel, from upstream to downstream. Such a direction D of travel is in particular shown in FIG. 2, as an arrow pointing from left to right. The movement of the products is therefore longitudinal. Furthermore, said movement is carried out overall in a horizontal or substantially horizontal plane, in particular along a conveying surface. Furthermore, the term "transverse" is understood to mean along a direction orthogonal or substantially orthogonal to said longitudinal direction D, substantially in the same horizontal plane.

That being the case, the transport is carried out by means of at least one installation 1 for conveying products.

Such a conveying installation 1 comprises at least one upstream conveyor 2 with a downstream end 20 and at least one downstream conveyor 3 with an upstream end 30.

In addition, the upstream end 30 of said downstream conveyor 3 is contiguous with the downstream end 20 of said upstream conveyor 2. In short, the conveyors 2, 3 are in abutment, with the products passing from one to the other during their conveyance. Furthermore, the conveyors 2, 3 may be used to convey products between stations of the production line, or may extend partially within such stations, moving the products for treatment thereof by said stations.

Such a conveyance of the products is carried out on the upper face of each of the conveyors 2, 3, the products resting with their bottoms on said upper face of each conveyor 2, 3. The products are thus transported in an upright manner, i.e. the largest dimension of the products extends vertically or substantially vertically, at a height orthogonal substantially orthogonal to the upper face of the conveyors.

Therefore, the upper faces of the conveyors 2, 3 form the conveying surface. This conveying surface extends overall along a horizontal or substantially horizontal mean plane, whether the conveyors 2, 3 are at the same height or at substantially equivalent heights, within a few millimeters or centimeters, or whether one or the other of the conveyors 2, 3 has a slight upward or downward inclination.

According to various embodiments, the conveyors 2, 3 comprise at least one mat, in particular provided with one or more endless belts mounted in a wound fashion. These belts may be of any type, in particular smooth or with an anti-skid constitution by means of a suitable material, such as rubber, or with freely rotating wheels. The type of belt is determined by the function that is performed and the type of products transported. Thus, the conveyors 2, 3 may be of the same type or a different type.

According to one embodiment, one and/or the other of the conveyors 2, 3 may be motorized, independently or jointly, imparting mobility to the conveying surface.

According to one embodiment, one and/or the other of the conveyors 2, 3 may be fixed, forming a table on the upper face of which the products move by sliding or rolling, by accumulation and pushing from the products coming from upstream.

The conveying installation 1 further comprises a transfer surface between the upstream end 30 and the downstream end 20. Such a transfer surface ensures the correct passage of the products when they cross the gap between the ends 20, 30. In short, the transfer surface forms a junction between the conveyors 2, 3 in order to allow the products to pass from one to the other and to ensure that no product is stalled in this interface between the conveyors, even if the upstream conveyor is stopped, in particular during the emptying of the conveying installation. Such a fixed upper face may comprise in particular a material that facilitates the sliding of products or wheels that are mounted to rotate freely.

Advantageously, this transfer surface comprises a transfer device 4 according to the invention.

Such a transfer device 4, hereinafter "device", comprises a structure 40. This structure 40 is used to support a transfer zone.

Said structure 40 may be fixedly attached to one and/or the other of the conveyors 2, 3, in particular to their corresponding frame, or to a frame of the conveying installation 1, said frame supporting in particular one and/or the other of the conveyors 2, 3, or to a lateral guide fitted to the installation 1 or to one and/or the other of the conveyors 2, 3.

Furthermore, the transfer zone extends partially along the length of the transfer surface, to within the clearance allowing in particular for the winding and movement of the conveyors 2, 3.

The transfer zone further comprises rollers 41. These rollers 41 are arranged in at least two rows extending in a parallel and contiguous manner. In particular, the transfer zone comprises at least a first row 410 of first rollers and an adjacent second row 411 of second rollers.

According to the embodiment shown in FIG. 3, the transfer device 4 comprises seven rows of rollers 41. The number of rows may vary depending on the length of the transfer surface to be covered by the transfer zone, i.e. the spacing between the conveyors 2, 3.

The number of rows may also vary depending on the dimensions of the rollers 41, in particular their diameter 44, and also their center distance 43. Therefore, the juxtaposition of the rows of rollers 41 forms the transfer zone.

It should be noted that two adjacent rows of rollers 41 are placed as close as possible to each other, to within the clearance allowing for rotation of said rollers 41, without one row contacting the other. The same applies to the rows at each end of the transfer zone, positioned as close as possible to the ends 20, 30 of the conveyors 2, 3, to within the clearance ensuring that the belts of said conveyors 2, 3 move without contacting the rollers 41, and also the non-contact rotation with the belts of said conveyors 2, 3.

As such, the rollers 41 are rotatably mounted in alignment along axles 42 transverse to said direction D. In short, each of said axles 42 extends orthogonally with respect to the longitudinal direction D of travel; each of said axles 42 also extending horizontally. With reference to FIG. 3, the axles 42 are parallel to the cross-sectional axes B-B' and C-C'. Preferably, the rotation of the rollers 41 is free, without any motorization.

Furthermore, the axles 42 are mounted at their ends on the structure 40. The axles 42 may also be supported along their length by supports 400, positioned between the rollers 41, as can be seen in particular in FIGS. 4 and 5.

According to a first advantageous feature, said rollers 41 comprise bearings mounted rotatably about said axles 42. Such bearings may be of any type, in particular of ball bearing, needle bearing or ceramic bearing type, or in the form of a bushing. In short, the rollers 41 are not simple wheels mounted to rotate freely by sliding against the surface of the axles 42, but via bearings ensuring less rolling resistance than for wheels and thus conferring a smoother rotation of said rollers 41, in particular with regard to the specific configuration of the transfer zone.

In this respect, according to a second advantageous feature, said transfer zone is inclined according to a slope 5 decreasing along said direction D. In short, the slope 5 forms a descent from upstream to downstream.

Furthermore, as can be seen in FIG. 2, the slope 5 extends along a straight line parallel to a plane passing through the axles 42 of the rollers of the rows. Therefore, the slope 5 is inclined at an angle between said passing through the axles 42 and a plane parallel to the surface of the upstream conveyor 2. Preferably, the slope 5 is inclined relative to the horizontal.

According to one embodiment, said slope 5 decreases with a degree of declivity less than or equal to 23° (twenty-three degrees), i.e. less than or equal to 42.45%. As can be seen in FIG. 3, this degree of declivity may be understood relative to a plane containing the surface of the upstream conveyor 2, or relative to a horizontal.

According to one embodiment, said slope 5 decreases with a degree of declivity less than or equal to 12° (twelve degrees), i.e. less than or equal to 21.26%.

According to a preferential embodiment, said slope 5 decreases with a degree of declivity less than or equal to 7° (seven degrees), i.e. less than or equal to 12.28%.

Therefore, because of this small slope 5, it is the bearings of the rollers 41 that ensure their rotational movement under the weight of the products in a way sufficient to move said products along said transfer zone under the action of gravity alone. In short, once the products are resting with their bottoms on the transfer zone, in particular with their center of gravity aligned with or exceeding the axle 42 of the most upstream row, it is then no longer necessary to move or push said products from the upstream conveyor 2: these products descend naturally along the slope 5 of the transfer zone.

According to a third advantageous feature, the gravitational movement along the transfer zone is conferred by a specific arrangement of the rollers 41 between the rows 410, 411, tending to flatten the upper tangent plane forming the transfer face on which the products progress.

To do this, the first rollers of the first row 410 are staggered with respect to the second rollers of the second row 411. In other words, the rollers 41 are offset between the first row 410 and the second row 411, so that the ends of the first rollers of the first row 410 are not aligned with the ends of the second rollers of the second row 411, with the exception of the distal ends of the rows located at the structure 40. In short, the distal ends are located on either side of the transfer device 4, i.e., on the right and on the left relative to the longitudinal direction D of travel.

Such a configuration can be seen in particular in FIG. 3, highlighting the staggered configuration of adjacent rows. The offset is therefore effected between two adjacent rows. FIGS. 4 and 5 show, in particular, the specific placement of the supports 400 of the axles 42 depending on the offset achieved.

Furthermore, according to this embodiment, the first rollers located at the ends of the first row 410 have a larger transverse dimension than the second end rollers of the second row 411, in order to achieve said offset.

According to a preferred embodiment, as can be seen in FIG. 3, the transfer zone comprises a plurality of identical first rows 410 separated by second rows 411, which are also identical to each other. The term "identical" refers to the transverse dimension of the rollers 41.

According to another embodiment, one and/or the other of the first rows 410 may be identical or different, namely with identical or different transverse dimensions of the first rollers.

According to another embodiment, one and/or the other of the second rows 410 may be identical or different, namely with identical or different transverse dimensions of the second rollers.

Therefore, the offset of the rollers 41 between the rows 410, 411 forms an overall planar transfer face, improving the movement of products along the transfer zone. In fact, the staggered arrangement between the successive rows of rollers 41 confers several points and lines tangential to said rollers 41, on which the bottom of the products rests during their movement along the transfer zone. Thus, there is no longer any risk of the bottom catching on a point of a roller (which often happened in the case of the ends of wheels in two successive rows that were aligned longitudinally, thus unbalancing or changing the positioning of the products).

According to one configuration, the planarity of the transfer zone is improved by a specific dimension of the rollers 41.

According to one embodiment, said rollers 41 have a diameter 44 less than or equal to twenty millimeters (20 mm).

According to a preferred embodiment, said rollers 41 have a diameter 44 less than or equal to eleven millimeters (11 mm).

Therefore, the small diameter 44 of the rollers 41, relative to the size of the windings of the conveyors 2, 3 at their ends 20, 30, allows the transfer device 4 to be positioned as close as possible to said ends 20, 30, with a smaller gap between the transfer device 4 and said ends 20, 30.

Furthermore, according to one configuration, the rollers 41 of all rows have equal diameters 44.

According to another configuration, the first rollers of the first row 410 have a diameter 44 larger or smaller than the diameter 44 of the second rollers of the second row 411.

In this case, the axle 42 of the first row 410 may be offset in height relative to the axle 42 of the second row 411, in order to maintain the planarity of the face of the transfer zone.

It should be noted that the diameter 44 of the rollers 41 in one row is the same.

According to one configuration, the planarity of the transfer zone is improved by a specific spacing of the rollers 41.

According to one embodiment, a center distance 43 between the first rollers of the first row 410 and the second rollers of the second row 411 is greater than said diameter 44 by no more than five millimeters (5 mm).

According to a more precise embodiment, said center distance 43 is between one and three millimeters (between 1 mm and 3 mm).

According to a preferred embodiment, said center distance 43 is at most one millimeter (1 mm).

In particular, the center distance 43 is defined in relation to the diameters 44 of all the rollers 41 if they are the same, or the largest diameters 44, or the smallest diameters 44, or an average of the diameters 44.

Furthermore, the small dimension of the center distance 43 is made possible by mounting the rollers 41 on bearings, precisely limiting the rolling movement and consequently decreasing the required clearance between the adjacent rows 410, 411.

As mentioned previously, the invention also relates to an installation 1 for conveying products in a longitudinal direction D of travel from upstream to downstream.

Such a conveying installation 1 comprises at least one upstream conveyor 2 with a downstream end 20 and at least one downstream conveyor 3 with an upstream end 30.

In addition, the upstream end 30 of said downstream conveyor 3 is contiguous with the downstream end 20 of said upstream conveyor 2.

The installation further comprises a transfer surface between the upstream end 30 and the downstream end 20.

Advantageously, said transfer surface comprises a transfer device 4 as described previously.

According to one embodiment, the upstream end 30 of the downstream conveyor 3 is positioned below the downstream end 20 of the upstream conveyor 2. This difference in height allows the transfer device 4 to be installed in a sloping configuration.

According to one embodiment, the upstream end 30 of the downstream conveyor 3 is positioned below the downstream end 20 of the upstream conveyor 2 at a height of no more than fifty millimeters (50 mm). In short, there is a maximum drop of five centimeters (5 cm) between the surface of the upstream conveyor 2 and the surface of the downstream conveyor 3, measured at their ends 20, 30.

According to a preferred embodiment, the upstream end 30 of the downstream conveyor 3 is positioned below the downstream end 20 of the upstream conveyor 2 at a height of no more than twenty millimeters (20 mm). In short, there is a maximum drop of two centimeters (2 cm) between the surface of the upstream conveyor 2 and the surface of the downstream conveyor 3, measured at their ends 20, 30.

According to another embodiment, the conveyors 2, 3 are located at the same height and it is the difference in winding and/or belt thickness between the ends 20, 30 that provides the degree of slope 5 of the transfer device 4.

Thus, the transfer device 4 and the conveying installation 1 ensure an improved gravitational movement of the products by combining several specific technical features. Said transfer device 4 has no stationary plate in its transfer zone, using a free rotation of its rollers 41, optimized because they are mounted on bearings. In addition, the use of bearings extends the life of the rollers 41.

Furthermore, the transfer device 4 has dimensions that allow it to be incorporated into an existing installation, directly replacing a transfer plate, without requiring any modification of the conveyors 2, 3 but simply by adjusting, in particular, the height of the downstream conveyor 3.

Moreover, the short length of the transfer device 4, combined with its features, in particular the planarity and the gentle slope, ensures that the products and even small batches (i.e. dimension less than the length of the transfer zone) do not stall along this interface, in particular at the time of emptying the conveying installation 1.

The present invention therefore relates to a device for transferring products between two conveyor ends, in order to facilitate the passage from an upstream conveyor to a downstream conveyor. The configuration of the device according to the invention makes it possible to fill the space between two conveyors while ensuring the balance and configuration of the products, due to the specific design of the transfer zone.

The transfer device according to the invention thus forms a transfer surface between an upstream conveyor and a downstream conveyor, more precisely between two conveyor ends.

The transfer device according to the invention has rollers which are arranged in such a way as to produce an almost planar surface. The axis of rotation of the rollers is transverse to the direction of travel. The rollers are arranged in at least two rows extending in a parallel and contiguous manner, i.e. very close to each other. The fact that the rollers are mounted in alignment along axles transverse to the direction of travel means that the rollers form a single continuous row: the rollers in one row are aligned in such a way that a row does not have any zones forming dimples or holes. In other words, each row is formed by a succession of rollers in a direction transverse to the product feed. Each of the at least two rows of rollers is therefore transverse to the transport direction, and the rows are parallel to each other. The staggered arrangement of the rollers between each row allows a product to circulate on an almost planar surface, and not to be in contact on a succession of roller ends, as would be the case if the arrangement were not staggered but identical on each row.

A roller according to the invention is a cylinder having a length greater than its diameter. In other words, the rollers extend significantly along their axis of rotation.

The transfer device, due to this configuration of the rollers, has an almost planar surface, and allows the stable movement of containers from an upstream conveyor to a downstream conveyor.

The invention claimed is:

1. A device for transferring products in a longitudinal direction of travel from upstream to downstream, comprising:
   a transfer zone and a structure, said structure supporting the transfer zone;
   said transfer zone comprising at least two parallel and contiguous rows of rollers rotatably mounted in alignment along axles transverse to said direction, including a first row of first rollers and an adjacent second row of second rollers, wherein said transfer zone is inclined with a decreasing slope along said direction;

said rollers comprise bearings mounted rotatably about said axles;

the first rollers of the first row are staggered with respect to the second rollers of the second row, forming an overall planar transfer face, and wherein ends of at least a portion of the first rollers of the first row and ends of at least a portion of the second rollers of the adjacent second row are not aligned with each other.

2. The transfer device as claimed in claim 1 wherein said slope decreases with a degree of declivity less than or equal to 23°.

3. The transfer device as claimed in claim 1, wherein said rollers have a diameter less than or equal to 20 millimeters.

4. The transfer device as claimed in claim 3, comprising a center distance between the first rollers and the second rollers, said center distance being greater than said diameter by no more than 5 millimeters.

5. A conveying installation for conveying products in a longitudinal direction of travel from upstream to downstream, comprising at least one upstream conveyor with a downstream end; at least one downstream conveyor with an upstream end, the upstream end of said downstream conveyor being contiguous with the downstream end of said upstream conveyor; a transfer surface between the upstream end and the downstream end wherein said transfer surface comprises a transfer device as claimed in claim 1.

6. The conveying installation as claimed in claim 5, wherein the upstream end of the downstream conveyor is positioned below the downstream end of the upstream conveyor at a height of no more than 50 millimeters.

7. The transfer device as claimed in claim 1, wherein said slope decreases with a degree of declivity less than or equal to 7°.

8. The transfer device as claimed in claim 2, wherein said rollers have a diameter less than or equal to 11 millimeters.

9. The transfer device as claimed in claim 3, comprising a center distance between the first rollers and the second rollers, said center distance being greater than said diameter by no more than 1 millimeter.

10. The conveying installation as claimed in claim 5, wherein the upstream end of the downstream conveyor is positioned below the downstream end of the upstream conveyor at a height of no more than 20 millimeters.

* * * * *